United States Patent [19]

Asai et al.

[11] 4,272,464

[45] Jun. 9, 1981

[54] METHOD FOR PREVENTING PLASTICIZER BLEEDING ON POLYVINYL CHLORIDE SHAPED ARTICLES

[75] Inventors: Michihiko Asai, Fujisawa; Yoshio Suda, Hachioji; Kiyoshi Imada, Omiya; Susumu Ueno; Hirokazu Nomura, both of Ibaragi, all of Japan

[73] Assignees: Agency of Industrial Science and Technology; Shin-Etsu Chemical Co., Ltd., both of Japan

[21] Appl. No.: 51,151

[22] Filed: Jun. 22, 1979

[30] Foreign Application Priority Data

Jun. 26, 1978 [JP] Japan .................................. 53-77294

[51] Int. Cl.$^3$ .............................................. H05B 7/00
[52] U.S. Cl. .................... 264/22; 204/167; 204/169; 260/23 XA; 260/30.4 N; 260/30.6 R; 260/31.2 N; 260/31.6; 260/31.8 M; 525/129
[58] Field of Search ......................... 264/22, 83, 85; 260/31.8 M, 23 XA, 30.4 N, 31.6, 31.2 N, 30.6 R; 204/165, 167, 169; 525/129

[56] References Cited

U.S. PATENT DOCUMENTS

| 3,257,261 | 6/1966 | Hochberg | 260/31.8 M |
| 3,846,521 | 11/1974 | Osterholtz | 264/22 |
| 4,046,843 | 9/1977 | Sano | 264/83 |

*Primary Examiner*—James H. Derrington
*Attorney, Agent, or Firm*—McGlew and Tuttle

[57] ABSTRACT

A method for preventing bleeding of plasticizers on the surface of shaped articles of plasticized polyvinyl chloride resins. The method comprises the steps of (a) blending a urethane elastomer with the polyvinyl chloride resin together with the plasticizer and other optional additives prior to fabrication of the polyvinyl chloride resin composition into shaped articles, (b) fabricating the resin composition into desired shaped articles, and (c) subjecting the thus shaped article to a treatment with low temperature plasma of a gas. Carbon monoxide is preferred as the gas for the plasma atmosphere.

11 Claims, No Drawings

METHOD FOR PREVENTING PLASTICIZER BLEEDING ON POLYVINYL CHLORIDE SHAPED ARTICLES

BACKGROUND OF THE INVENTION

The present invention relates to a method for preventing bleeding of plasticizers on the surface of shaped articles of a plasticized polyvinyl chloride resin.

Polyvinyl chloride resins are one of the most important classes of thermoplastic synthetic resins used for manufacturing various kinds of shaped articles useful in a very wide field of applications. Shaped articles of polyvinyl chloride resins are classified as being of the rigid type or the flexible type according to the absence or presence of a substantial amount of a plasticizer in the resin compositions. Namely, the rigidity or flexibility of shaped articles of a polyvinyl chloride resin can be controlled by the incorporation of a plasticizer such as a phthalic ester and the thus plasticized polyvinyl chloride resins are fabricated into various kinds of flexible articles including films, sheets, synthetic leathers, tubes, hoses, bags, packings, covering materials and the like, which articles are directed to the uses in fields of medical and sanitary wares, cooking wares, wrapping materials for foodstuffs, insulation of electric wires, materials used in agricultural plant growing, materials for buildings and the like.

One of the most difficult problems relating to shaped articles of plasticized polyvinyl chloride resins is the so-called bleeding of the plasticizer contained therein. This phenomenon is characterized by the plasticizer, contained in the body of the shaped article, migrating with time toward the surface of the article and then being lost by evaporation into the atmosphere. This phenomenon of bleeding of the plasticizer as well as of the other additives contained in the shaped articles is so remarkable that not only the beauty in appearance but also various mechanical or physical properties are detrimentally affected, giving rise to a shortened serviceable life of the articles.

This phenomenon of bleeding is especially undesirable when the shaped article is to be used for a medical purpose, such as for a bag or container of blood used for transfusion or for use in contact with foodstuffs because of the toxicity of the plasticizer and other additives presenting limitations to the application of polyvinyl chloride resins.

Various attempts have been made hitherto to decrease the bleeding of plasticizers and other additives on the surface of articles, utilizing an irradiation of the article with ionizing radiations or ultraviolet light, corona discharge at a relatively high gas pressure, e.g. larger than 100 Torr, and treatment with chemicals. These prior methods are to some extent effective for improving various surface properties of articles of polyvinyl chloride resins such as heat resistance, anti-solvent resistance, affinity for water, electrostatic charging, printability and the like but the effectiveness of these method in preventing plasticizer bleeding is rather small. Moreover, it is sometimes unavoidable that certain properties of the shaped articles of polyvinyl chloride resins are disadvantageously affected by these methods.

For example, the irradiation of articles with an ionizing radiation produces crosslinks not only in the surface layer but also in the body of the article with its high energy resulting in undesirable change in the mechanical properties of the plasticized polyvinyl chloride resins. The irradiation with ultraviolet light is disadvantageous in the coloring of the surface due to the oxidative degradation taking place in the surface layer of the articles. The treatment with corona discharge is not practicable due to the large difficulty in control of the process due to the rather unstable nature of the discharge. Further, chemical means are not free from the problems of erosion by the chemicals or poor adhesiveness or durability of the coating compositions.

SUMMARY OF THE INVENTION

The present invention has been established as a result of extensive investigations carried out by the inventors on the above described technical problems to prevent bleeding of a plasticizer on the surface of a shaped article of plasticized polyvinyl chloride resins and the method of the invention comprises the steps of (a) blending a urethane elastomer with the polyvinyl chloride resin before the polyvinyl chloride resin is fabricated into a shaped article, (b) fabricating the polyvinyl chloride resin admixed with the urethane elastomer into a shaped article, and (c) subjecting the thus shaped article to a treatment with low temperature plasma of a gas.

DETAILED DESCRIPTION OF THE PREFERRED EMBODIMENTS

The polyvinyl chloride resins used in the above mentioned step (a) are not particularly limited to certain specific types of polyvinyl chloride resins including homopolymers of vinyl chloride of various average degrees of polymerization but include copolymers of vinyl chloride with one or more copolymerizable comonomers with the main component, say, 50% by weight or more, of the copolymer being vinyl chloride. The comonomers copolymerizable with vinyl chloride are well known in the art and exemplified by vinyl esters such as vinyl acetate, vinyl ethers such as vinylethyl ether, acrylic and methacrylic acids and esters thereof, maleic and fumaric acids and esters thereof, maleic anhydride, aromatic vinyl compounds such as styrene, vinylidene halides such as vinylidene chloride, acrylonitrile, methacrylonitrile, olefins such as ethylene and propylene, and the like.

In step (a) of the inventive method, a urethane elastomer is blended with the above defined polyvinyl chloride resin. This component of the urethane elastomer is effective in accelerating crosslink formation on the surface layer of the shaped articles in the subsequent treatment with low temperature plasma so that the bleeding of the plasticizer is effectively prevented. The urethane elastomer also contributes to a decrease in the amount of the plasticizer as well as to the enhancement of the flexibility of the shaped articles as it functions as a kind of rubbery elastomer conventionally employed in the art with the above purposes together with additional advantages of improved appearance and smoothness on the surfaces of the shaped articles.

The urethane elastomers used here include various rubbery polymeric substances having polymeric chains linked mainly with urethane linkages —NH—CO—O— and crosslinked to give rubber-like elasticity. They are readily prepared by known methods for the reaction of a polyesterpolyol and a diisocyanate. The polyesterpolyols are prepared in turn by the polycondensation reaction of esterification or transesterification between an aliphatic dibasic or tribasic acid such as adipic acid, azelaic acid and the like and a polyol such as 1,4-butanediol, 1,6-hexanediol, neopentylglycol, 1,2-propyleneglycol, 1,3-butyleneglycol, trimethylolpropane and the like or by the polymerization of a lactone with a dicarboxylic acid as the polymerization initiator. The diisocyanates include aromatic diisocyanates such as 4,4'-diphenylmethane diisocyanate, 4,4'-phenylene diisocyanate and aliphatic diisocyanates such as butylene diisocyanate, hexamethylene diisocyanate and the like.

The amount of the urethane elastomer to be blended with the polyvinyl chloride resin is preferably in the range from 5 to 120 parts by weight or, more preferably, from 5 to 60 parts by weight per 100 parts by weight of the polyvinyl chloride resin. An amount below the above range reduces the effectiveness of the treatment with low temperature plasma in the subsequent step (c) while an excessive amount over the above range leads to the disappearance of the properties inherent to the polyvinyl chloride resins.

The blending of the urethane elastomer with the polyvinyl chloride resin can of course be performed, among other ways, simultaneously with the blending of the other additives including the plasticizer which is an essential component in the plasticized polyvinyl chloride resins by means of a suitable conventional blending means such as a roller mill and the like, preferably, at an elevated temperature.

The plasticizers, of which the bleeding on the surface of shaped articles can be effectively prevented by the inventive method, include various classes such as esters of phthalic acid exemplified by dioctyl phthalate, dibutyl phthalate and the like, esters of an aliphatic dibasic carboxylic acid exemplified by dioctyl adipate, dibutyl sebacate and the like, glycol esters exemplified by esters of pentaerithritol, diethyleneglycol dibenzoate and the like, esters of an aliphatic monobasic carboxylic acid exemplified by acetylricinoleic acid and the like, esters of phosphoric acid exemplified by tricresyl phosphate, triphenyl phosphate and the like, epoxidated fatty acids exemplified by epoxidated soybean oil, epoxidated linseed oil and the like, bisphenol-based epoxy resins, esters of citric acid exemplified by acetyltributyl citrate, acetyltrioctyl citrate and the like, trialkyl trimellitate, tetra-n-octyl pyromellitate and polypropylene adipate as well as other types of polyester plasticizers. The amount of the plasticizer in the plasticized polyvinyl chloride resin composition is usually in the range from 30 to 70 parts by weight per 100 parts by weight of the resin although the amount may be reduced when the composition contains a substantial amount of rubbery elastomers.

The effectiveness of the inventive method is not impaired by the presence of various additives other than the plasticizer including fillers, anti-oxidants, ultraviolet light absorbers, stabilizers, anti-static agents, anti-fogging agents, pigments, dyestuffs, crosslinking aids and the like. These additives may of course be blended with the polyvinyl chloride resin either simultaneously with, prior to or after the blending of the urethane elastomer and/or the plasticizer with the resin and the bleeding or blooming of these additives is also prevented by the inventive method insofar as the amounts thereof are not excessively large beyond ordinary formulations.

In addition to the above mentioned additives, the polyvinyl chloride resin composition comprising the urethane elastomer and the plasticizer may contain, according to need, certain rubbery elastomers other than urethane elastomers such as ethylene-vinyl acetate copolymers, acrylonitrile-butadiene copolymers, styrene-acrylonitrile copolymers, styrene-butadiene copolymers, methyl methacrylate-styrene-butadiene copolymers, acrylonitrile-styrene-butadiene copolymers, polyamide resins, polymers of caprolactam, epoxy-modified polybutadiene resins and the like. When these rubbery elastomers are formulated, it is recommended that the total amount of these polymers and the urethane elastomer does not exceed 120 parts by weight per 100 parts by weight of the polyvinyl chloride resin in order that the resultant resin composition may retain the properties inherent to the polyvinyl chloride resin.

The polyvinyl chloride resin composition thus obtained is then fabricated into a shaped article in step (b) of the inventive method. The techniques of fabrication are not limitative and any conventional methods can be applied according to the shape of the desired article and the moldability of the resin composition including extrusion molding, injection molding, calendering, inflation, blow molding, vacuum forming, compression molding and the like. The shapes of the articles are also not limitative although articles with complicated shapes, for example, with concavity may require specific elaboration in order to ensure uniform effet of treatment with low temperature plasma in the subsequent step (c) of the inventive method.

The shaped article obtained in the above step (b) of the inventive method is then subjected to a treatment with low temperature plasma. Low temperature plasma here implied is well known in the art as a gaseous atmosphere full of electrically charged species where the temperature of the gaseous atmosphere is not excessively high in comparison with the ambient temperature irrespective of the energies of the charged species per se. Low temperature plasma is produced mainly by glow discharge in a gaseous atmosphere of a pressure in the range from 0.001 to 10 Torr where the frequency of the electric power supply for the discharge is usually in the range from direct current to the microwave region but limited to this range. In particular, a frequency of the so-called high frequency region is recommended due to the possibility of obtaining stable plasma discharge. For example, a frequency of 13.56 MHz or 27.12 MHz is recommended since these frequencies are relatively free from statutory regulations for radio waves.

The shapes and arrangement of the electrodes are not limited insofar as a stable plasma discharge can be ensured within the space in which the surface of the shaped article is treated with, i.e. exposed to, the plasma atmosphere. Thus, a pair of inside electrodes, a pair of exterior electrodes and a coiled electrode may be used according to particular types of the apparatuses for plasma generation. The electrodes may be connected to the high frequency generator either by capacitive coupling or inductive coupling.

The intensity or power density of the low temperature plasma and the time required for the plasma treatment are interrelated parameters but extreme difficulties are encountered in explicitly defining the power density of low temperature plasma due to the very complicated nature of the plasma atmosphere which is beyond the understanding in the present state of the art. Therefore, it is the best approach that the time for the plasma treatment be determined in advance by a careful preparatory experiment in which several parameters including the supplied electric power are selected according to the specific purposes. With a power density obtained in most of the currently available apparatuses for plasma generation, a time from a few seconds to several tens of minutes is usually sufficient for obtaining the objective effect of the invention. In any case, it is a least requirement that the surface of the shaped articles never undergoes thermal degradation by the heat evolved by the discharge.

The other parameters to be taken into consideration in the plasma treatment are the kind of the gaseous constituents and the pressure of the gaseous atmosphere. The pressure of the gaseous atmosphere within the apparatus for plasma generation should be maintained in a range from 0.001 to 10 Torr or, preferably, from 0.01 to 1.0 Torr in order to ensure stability of the plasma discharge. The gases filling the apparatus under the above specified pressure is either inorganic or organic as exemplified by helium, neon, argon, nitrogen, nitrous oxide, nitrogen dioxide, oxygen, air, carbon monoxide, carbon dioxide, hydrogen, halogens, e.g. chlorine, and halogen compounds, e.g. hydrogen chloride, as well as olefins, e.g. ethylene and propylene, halogenated hydrocarbons, e.g. fluorocarbons, aromatic hydrocarbons, e.g. benzene, heterocyclic organic compounds, e.g. pyridine, organosilanes and the like. Among the above named gases, the inorganic gases are preferred to the organic ones due to the absence of coloration on the surface of the plasma-treated articles and formation of a powdery polymerized matter. In particular, helium, argon, carbon monoxide, carbon dioxide and hydrogen, especially, carbon monoxide, are preferred because of the higher efficiency by an unknown mechanism. These gases are used either singly or as a mixture of two or more and, when a mixed gas is used, it is recommended that one of the components is carbon monoxide.

The shaped articles obtained by the above described procedures of the inventive method have markedly reduced tenddency of plasticizer bleeding on their surface and, in addition, the flexibility of the surface layer which constitutes the barrier layer for the plasticizer is not lost because of the adequate density of crosslinks with good heat-sealability and weathering resistance as well as good mechanical properties, especially at low temperatures, such as tensile strength, resistance against scratches, impact strength and the like. Further, the shaped articles obtained by the inventive method have excellent surface properties such as improved affinity with water, less tendency toward staining and good resistance against oils and chemicals.

Following are examples to illustrate the present invention in further detail, in which the amounts labelled "parts" are all given by parts by weight.

EXAMPLE 1

A resin composition was prepared by intimately blending 100 parts of a homopolymeric polyvinyl chloride resin having an average degree of polymerization of about 1,000 (TK-1000, a trade name by Shin-Etsu Chemical Co., Japan), 50 parts of dioctyl phthalate, 2 parts of calcium stearate and 50 parts of a urethane elastomer (Takelac T-1040, a trade name by Takeda Pharm. Ind. Co., Japan) in a roller mill at 160° C. for 10 minutes and the resin composition was fabricated by press molding at 165° C. into a sheet of 1 mm thickness.

A 10 cm by 10 cm piece of the thus prepared sheet was placed on the lower electrode of 20 cm diameter facing the upper electrode with a distance of 3 cm in an apparatus for plasma generation and low temperature plasma was generated by a high frequency power supply of 50 watts at a frequency of 13.56 MHz for 2 minutes or 3 minutes while the pressure in the apparatus was maintainted at 0.2 Torr by passing carbon monoxide gas with simultaneous evacuation with a pump.

The resin sheet thus treated with low temperature plasma on a surface was then subjected to the test for the plasticizer bleeding in the manner described below. Thus, the sheet suitably cut was placed on the bottom of a cylindrical extraction vessel of 100 ml capacity with the plasma-treated surface facing upside and set so that 26 cm$^2$ of the upper surface thereof alone into to contact with the extraction solvent introduced into the vessel and then 50 ml of n-hexane was introduced into the vessel with subsequent shaking at 37° C. for 2 hours. The concentration of the plasticizer in the extract solution was determined by gas chromatography and recorded in mg as set out in Table 1 below.

For comparison, the same experiment was repeated except that the urethane elastomer was omitted in the above formulation of the resin composition and the results of the extracted amount of the plasticizer are shown in the same table.

For further comparison, the extraction test with n-hexane was undertaken for the sheets before the plasma treatment to give the results as set out in the same table.

TABLE 1

| Urethane elastomer | Time of plasma treatment | | |
|---|---|---|---|
| | 0 minute | 2 minutes | 3 minutes |
| Yes | 92.3 mg | 7.7 mg | 1.3 mg |
| No | 126.3 mg | 62.3 mg | 12.1 mg |

EXAMPLE 2

A resin composition was prepared by intimately blending 100 parts of the same polyvinyl chloride resin as used in Example 1, 30 parts of dioctyl phthalate, 10 parts of the same urethane elastomer as used in Example 1, 1 part of calcium stearate and 1 part of zinc stearate in a roller mill at 160° C. for 10 minutes and the resin composition was fabricated by press molding at 165° C. into a sheet of 1 mm thickness.

The treatment of the thus prepared sheet with low temperature plasma was undertaken in the same manner as in Example 1 except that the pressure of carbon monoxide, the electric power supplied to the electrodes and the time of the treatment were 0.35 Torr, 100 watts and 3 or 5 minutes, respectively. The extraction test with n-hexane was carried out also in the same manner as in Example 1 with the above obtained plasma-treated sheet as well as with comparative sheets with no plasma treatment or no urethane elastomer to give the results as set out in Table 2 below.

TABLE 2

| Urethane elastomer | Time of plasma treatment | | |
|---|---|---|---|
| | 0 minute | 3 minutes | 5 minutes |
| Yes | 68.1 mg | 0.8 mg | 0.05 mg |
| No | 83.6 mg | 6.8 mg | 3.6 mg |

EXAMPLE 3

A resin composition was prepared by intimately blending 100 parts of a homopolymeric polyvinyl chloride resin having an average degree of polymerization of about 1,300 (TK-1300, a trade name by Shin-Etsu Chemical Co., Japan), 35 part of di(2-ethylhexyl)adipate, 2 parts of calcium stearate, 2 parts of zinc stearate and 50 parts of a urethane elastomer (Ultraholl PC, a trade name by Bayer Japan Co.) in a roller mill at 160° C. for 10 minutes and the resin composition was fabricated by press molding at 165° C. into a sheet of 1 mm thickness.

The treatment of the thus prepared sheet with low temperature plasma was undertaken in the same manner as in Example 2 except that the pressure of carbon monoxide and the time of the treatment were 0.5 Torr and 2 or 3 minutes, respectively. The extraction test with n-hexane was carried out in the same manner as in Example 2 with the above obtained plasma-treated sheet as well as with comparative sheets with no plasma treatment or no urethane elastomer to give the results set out in Table 3 below.

TABLE 3

| Urethane | Time of plasma treatment | | |
|---|---|---|---|
| elastomer | 0 minute | 2 minutes | 3 minutes |
| Yes | 67.1 mg | 11 mg | 2 mg |
| No | 92.3 mg | 46 mg | 23 mg |

EXAMPLE 4

A resin composition was prepared by intimately blending 100 parts of the same polyvinyl chloride resin as used in Example 3, 25 parts of dioctyl phthalate, 2 parts of calcium stearate, 2 parts of zinc stearate and 35 parts of a urethane elastomer (Vantex T-5265, a trade name by Dainippon Ink Chem. Co., Japan) in a roller mill at 160° C. for 10 minutes and the resin composition was fabricated by press molding at 165° C. into a sheet of 1 mm thickness.

The treatment of the thus prepared sheet with low temperature plasma was undertaken in an atmosphere of a 9:1 by volume mixed gas of argon and carbon monoxide in the same manner as in Example 3 except that the pressure of the plasma gas was 1.0 Torr. The extraction test with n-hexane was carried out in the same manner as in Example 3 with the above obtained plasma-treated sheet as well as with comparative sheets with no plasma treatment or no urethane elastomer to give the results set out in Table 4 below.

TABLE 4

| Urethane | Time of plasma treatment | | |
|---|---|---|---|
| elastomer | 0 minute | 2 minutes | 3 minutes |
| Yes | 59.3 mg | 6 mg | 1 mg |
| No | 76.8 mg | 32 mg | 6 mg |

What we claim is:

1. A method for preventing bleeding of a plasticizer on the surface of a shaped article of a plasticized polyvinyl chloride resin which comprises
   (a) combining the polyvinyl chloride resin with a plasticizer,
   (b) blending a urethane elastomer with the polyvinyl chloride resin prior to the fabrication of the polyvinyl chloride resin into a shaped article,
   (c) fabricating the polyvinyl chloride resin with plasticizer admixed with the urethane elastomer into a shaped article and
   (d) subjecting the shaped article to a treatment with low temperature plasma of a gas.

2. The method as claimed in claim 1 wherein the amount of the urethane elastomer is in the range from 5 to 120 parts by weight per 100 parts by weight of the polyvinyl chloride resin.

3. The method as claimed in claim 1 wherein the gas for the low temperature plasma is selected from the group consisting of helium, neon, argon, nitrogen, nitrous oxide, nitrogen dioxide, oxygen, air, carbon monoxide, carbon dioxide, hydrogen, halogens, halogen compounds, olefins, halogenated hydrocarbons, aromatic hydrocarbons, heterocyclic organic compounds and organosilanes.

4. The method as claimed in claim 1 wherein the gas for the low temperature plasma is carbon monoxide or a mixed gas containing carbon monoxide.

5. The method as claimed in claim 1 wherein the pressure of the gas is in the range from 0.001 Torr to 10 Torr.

6. A method for preventing bleeding of a plasticizer on the surface of a shaped article made of plasticized polyvinyl chloride resin comprising; blending a polyvinyl chloride resin with a urethane elastomer in an amount of 5 to 120 parts by weight of the urethane elastomer to 100 parts by weight of the polyvinyl chloride resin; combining the polyvinyl chloride with a plasticizer fabricating the blend of polyvinyl chloride resin, plasticizer and urethane elastomer into a shaped article; and subjecting the shaped article to treatment with a low temperature plasma of a gas, the plasma produced by electrical current and the gas selected from the group consisting of helium, neon, argon, nitrogen, nitrous oxide, nitrogen dioxide, oxygen, air, carbon monoxide, carbon dioxide, hydrogen, halogens, halogen compounds, olefins, halogenated hydrocarbons, aromatic hydrocarbons, heterocyclic organic compounds and organosilanes, with the pressure of the gas being from 0.001 to 10 torr.

7. A method according to claim 6, wherein the plasticizer which is prevented from bleeding on the surface of the shaped article is chosen from the group consisting of dioctyl phthalate, dibutyl phthalate, dioctyl adipate, dibutyl sebacate, esters of pentaerithritol, diethyleneglycol, dibenzoate, acetylricinoleic, tricresyl phosphate, triphenyl phospate, epoxidated soy bean oil, epoxidated linseed oil, bisphenol-based epoxy resins, acetyltributyl citrate, acetyltreoctyl citrate, trialkyl trimallitate, tetra-n-octyl, pyromellitate, and polypropylene adipate.

8. A method according to claim 7, wherein the amount of plasticizer to polyvinyl chloride resin compositions is in the range of 30 to 70 parts by weight per 100 parts by weight of the resin.

9. A method according to claim 6, further including additional additives selected from the group consisting of: fillers, anti-oxidants, ultra-violet light absorbers, stabilizers, anti-static agents, anti-fogging agents, pigments, dyestuffs, and crosslinking aids.

10. A method according to claim 6, further including the addition of rubbery elastomers in the amount of less than 120 parts per 100 parts of polyvinyl chloride resin.

11. A shaped article of plasticized polyvinyl chloride resin which does not bleed plasticizer from its surface made according to the method of claim 6 comprising a fabricated blend of urethane elastomer with the polyvinyl chloride resin and plasticizer which is exposed to treatment with low temperature plasma of a gas.

* * * * *